Patented May 30, 1950

2,509,884

UNITED STATES PATENT OFFICE 2,509,884

TALL OIL TREATMENT

Ronald Rosher, Wilmington, Del., assignor to Hercules Powder Company, Wilmington, Del., a corporation of Delaware No Drawing. Application May 24, 1947,
Serial No. 750,381

9 Claims. (Cl. 260—97.6)

This invention relates to tall oil and more particularly to a method of separating the resin acids from tall oil.

Tall oil is a by-product in the manufacture of paper pulp by digestion of wood with alkaline liquors such as alkaline solutions of sodium sulfide. Crude tall oil consists of a mixture of resin and fatty acids in roughly equal proportions together with minor amounts of neutral unsaponifiable materials containing mainly plant sterols.

Many methods have been employed in an attempt to isolate the resin acids of tall oil from the fatty acids and neutral bodies. Among the methods proposed for this purpose may be mentioned fractional crystallization, fractional distillation in vacuum or with superheated steam, selective extraction, selective esterification, and selective acidification of the resin and fatty acid soaps. None of these methods have proved commercially successful, however, because effective separation was not obtained in most cases, and in those cases where separation was efficient the processes were so complicated that they were not feasible from a practical standpoint.

Now, in accordance with this invention, it has been found that an efficient, economical and simple method of separating the resin acids from tall oil may be effected by selectively esterifying tall oil to form a mixture containing fatty acid esters and resin acids, dissolving this mixture in a liquid petroleum hydrocarbon solvent, and precipitating the resin acids from the resulting solution with cyclohexylamine. In contrast to the prior art methods the present method using cyclohexylamine is advantageous because it yields a resin acid product which is much superior in quality and yield to the products obtained from processes involving crystallization, distillation, and the like.

In carrying out the process of this invention, the tall oil fatty acids are selectively esterified with an alcohol such as methyl alcohol after which the excess methyl alcohol is removed usually by distillation. The resulting mixture of resin acids and the methyl esters of the fatty acids then is dissolved in a liquid petroleum hydrocarbon solvent such as gasoline and to the resulting solution cyclohexylamine is added either per se or as a solution in the same solvent used to dissolve the mixture of resin acids and fatty acid methyl esters. An amount of the amine is added thereoretically sufficient to neutralize all of the resin acids present in the tall oil. On addition of the amine heat is developed and the amine salts of the resin acids precipitate at once. The suspension of the salts in the solution may then be agitated well, cooled, and the salts filtered and washed with additional solvent until the wash liquors are colorless. The amine salts of the resin acids are then decomposed either with heat or acid to regenerate the free acids and recover the amine. The remaining solution, now containing principally the methyl esters of the fatty acids, may be subjected to fractional distillation to remove the solvent and recover the fatty acid esters.

The following examples constitute specific illustrations of this invention. All amounts are based on parts by weight.

Example 1

Two hundred parts of a tall oil having an acid number of 166 and containing approximately 40–45% resin acids was refluxed with about 25 parts of methyl alcohol and 6 parts of concentrated sulfuric acid for 3 hours. Upon completion of this reaction period the reaction mixture was cooled to 20° C., the lower layer of sludge removed, and the remainder of the reaction mixture dissolved in about 250 parts of narrow range gasoline. The gasoline solution then was heated to 90° C. and washed once with about 400 parts of hot water. The solution then was cooled to a temperature of 20° C., filtered, and 27 parts of cyclohexylamine added. The cyclohexylamine salts of the resin acids precipitated immediately and were filtered from the gasoline solution and washed with about 100 parts of fresh narrow range gasoline. The salts then were heated on a steam bath with about 230 parts of 20% sulfuric acid and the liberated resin acids were taken up in about 145 parts of narrow range gasoline. This gasoline solution was washed once with 200 parts of hot water, then the gasoline was removed by distillation. There was obtained 74 parts of resin acids with an acid number of 173.5 and a melting point of 91° C.

The gasoline solution containing the methyl esters of the fatty acids and other neutral substances was washed once with 200 parts of 5% sulfuric acid, then the solution was subjected to fractional distillation. After a forerun of narrow range gasoline there was obtained 79 parts of the methyl esters of the fatty acids, these esters distilling between 150° and 162° C. under a pressure of 1 mm. of mercury. The distillation residue amounted to 35 parts and had an acid number of 38.5 and a saponification number of 123.0.

Example 2

One hundred three parts of a tall oil having an acid number of 163.0 and a resin acid content of about 50% was heated in an autoclave with 55 parts of methyl alcohol at a temperature of 195° to 205° C. for 8 hours. The product constituted 101 parts and had an acid number of 87. Ninety-three and one-half parts of this product was dissolved in 175 parts of Solvesso No. 3 and to the resulting solution was added 16 parts of cyclohexylamine. The cyclohexylamine salts of the resin acid precipitated at once and were filtered and washed with 105 parts of fresh Solvesso No. 3. The salts were decomposed by dissolving them in 140 parts of hot Solvesso No. 3 and distilling off all the solvent. The resin acid product obtained constituted 40 parts and had an acid number of 168.0.

Although the examples have shown the use of two particular grades of tall oil, any grade may be used, no matter how great or small the resin acid content, in accordance with the process of this invention in order to effect a separation of the resin acids from the fatty acids and neutral bodies.

The amine which is operable in accordance with this invention is cyclohexylamine. This amine is used in approximately molar quantities per mole of resin acids present in the tall oil as calculated from the acid number of the tall oil following the selective esterification of the fatty acids. By such a calculation an amount of cyclohexylamine at least theoretically equivalent to the amount of resin acids present is insured. Excess cyclohexylamine may be used without causing either an increase or decrease in the yield of amine salts of the resin acids, but an amount of this amine insufficient to react with all of the resin acids should be avoided.

The examples have set forth the use of narrow range gasoline and Solvesso No. 3 as solvents for the tall oil during the amine treatment. In general, however, there may be used as a solvent any liquid petroleum hydrocarbon such as gasoline, petroleum ether, heptane, hexane, and the like. Preferably, the liquid petroleum hydrocarbon will have a boiling point between about 90° and about 150° C. When gasoline is used as the solvent, it preferably is substantially free of aromatic hydrocarbons. A particularly applicable material is the narrow range gasoline shown in Example 1, this gasoline being a gasoline fraction boiling between about 96° C. and about 127° C. and having a minimum aniline point of 60° C., the latter value indicating that substantially no aromatic hydrocarbons are present. The specific gravity of this gasoline is approximately 0.7100 at 20° C. as compared to water at 20° C. Typical samples of the material exhibited specific gravities of 0.7090 and 0.7138 at 20° C. The Solvesso No. 3 utilized in Example 2 is a narrow range petroleum hydrocarbon solvent having a specific gravity of 0.7030 at 15.56° C. and a boiling point range of 60° to 98.9° C. (Standard Oil Company of New Jersey). In all of the solvents the concentration of the selectively esterified tall oil may be from about 15 to about 50%, but a preferable concentration is from about 20 to about 25% on this basis.

The cyclohexylamine may be added to the solution of the selectively esterified tall oil in the liquid petroleum hydrocarbon solvent either as such or as a solution in the same solvent used to dissolve the selectively esterified tall oil. If a solution of the amine is not used, addition of the amine should be gradual since a high concentration of the amine in the petroleum hydrocarbon solvent solution causes a vigorous reaction. When a solution of the cyclohexylamine is utilized, it is convenient to use about a 50% solution of the amine although other concentrations are operable. During addition of the amine agitation may be employed to insure thorough contact of the reaction components.

The formation of the amine salts is an exothermic reaction and the temperature of the reaction mixture should be maintained between about −10° C. and just below the boiling point of the solvent used. A desirable temperature range is between about −10° C. and about 50° C. during addition of the amine. The preferable temperature range is between about 10° and about 30° C. and the most applicable temperature is 25° C. Unless the temperature is maintained within these limits, the reaction is too vigorous. Furthermore, the suspension of the amine salts in the liquid petroleum hydrocarbon solvent may be cooled to a temperature between about −10° C. and about 20° C. before the salts are filtered, since the salts, depending upon the particular solvent used, are more or less soluble therein at temperatures above 20° C. A temperature between about 0° C. and about 10° C. may be conveniently obtained using an ice bath. During the cooling process agitation of the suspension may be carried out.

The amine salts may be separated from the reaction mixture by any of the accepted methods, such as filtration or by centrifugation. After the separation, the salts may be washed with fresh solvent until the wash liquors are colorless. Small amounts of wash solvent should be used and it is somewhat undesirable to form a slurry of the salts in the solvent, since some solubilization loss may then be incurred. The salts then may be dried.

To decompose the amine salts, several different procedures may be utilized. As shown in Example 1 the cyclohexylamine salts may be heated in the presence of sulfuric acid and the liberated resin acids extracted with narrow range gasoline. Another procedure is that shown in Example 2 wherein the salts were dissolved in a liquid petroleum hydrocarbon solvent and heated, the solvent being distilled off during the heating process. In such an instance the heating is usually carried out at the reflux temperature of the solvent utilized, and the reflux temperature is sufficiently high that the heat effects decomposition of the salts. Another procedure for decomposition of the salts involves decomposition at the melting point, 185° to 190° C., by heating and sparging off the cyclohexylamine with steam. In place of steam, nitrogen, carbon dioxide, or a similar gas may be used. The salts also may be decomposed by suspending them in a petroleum hydrocarbon solvent or ether and treating them with dilute sulfuric, hydrochloric, or acetic acids. Other acids such as phosphoric, chloroacetic, and the like also may be utilized. In case sulfuric acid is used to effect the decomposition, it is desirable to use a sulfuric acid which does not exceed 7% in concentration. Sulfuric acid of 7% concentration yields a nearly saturated solution of cyclohexylammonium sulfate. The methods of decomposition involving the use of an acid are preferable because they result in less color degradation.

The solution remaining after precipitation of the resin acids may be processed to recover the fatty acid esters. This may be effected most simply by subjecting the solution to fractional distillation in order to remove the solvent and recover the fatty acid esters. The fatty acid esters may be originally formed in the tall oil by a process of selective esterification with a monohydric aliphatic alcohol such as the methyl, ethyl, propyl, butyl, isobutyl and secondary butyl alcohols, or with a polyhydric alcohol such as ethylene glycol, glycerin and the like. Preferably, however, it is desirable to utilize methyl or ethyl alcohol. The esterification may be effected at atmospheric pressure by refluxing the tall oil with the alcohol in the presence of an esterification catalyst such as sulfuric acid, or it may be carried out by heating the mixture of tall oil and alcohol at superatmospheric pressure, as in an autoclave, in the absence of a catalyst. In either case, the esterification can be controlled so that the fatty acids alone are esterified. Upon completion of the esterification, the excess alcohol may be removed by distillation.

The process of this invention is based upon the fact that the cyclohexylamine reacts readily with the resin acids contained in the selectively esterified tall oil to form substituted ammonium salts of the resin acids which are insoluble in the liquid petroleum hydrocarbon solvent. The cyclohexylamine salts are formed by a direct reaction between the amino group of the cyclohexylamine and the carboxyl group of the resin acids.

By the process of this invention a practical and economical means of separating the resin acids from tall oil is provided. Constant regeneration of the cyclohexylamine and efficient recovery of the solvent are feasible aspects of the process. Processes previously used by the art mainly have been designed to yield a suitable fatty acid fraction from tall oil. As a result the resin acid-containing fractions have invariably been of inferior quality and have been incapable of serving as a cheap substitute for rosin since they have contained appreciable amounts of fatty acids and neutral bodies as contaminants. The process in accordance with this invention, however, yields a product that is practically pure resin acid and has, consequently, a high acid number and a high melting point. The process produces resin acids having acid numbers of about 170 to about 190, bromine numbers of about 100 to about 150, and colors on the rosin scale between about F and about I, thereby providing acids comparable to those obtained directly from wood. The process also is advantageous in that inexpensive hydrocarbon solvents may be utilized, in that smaller amounts of cyclohexylamine may be used than if the fatty acids were not first esterified and in that the precipitated cyclohexylamine salts may be more easily filtered and washed due to the absence of contamination by partially insoluble and oily fatty acid cyclohexylamine salts.

What I claim and desire to protect by Letters Patent is:

1. The process of separating the resin acids from tall oil which comprises selectively esterifying tall oil to form a mixture comprising fatty acid esters and resin acids, dissolving said mixture in a liquid petroleum hydrocarbon solvent, and precipitating the resin acids from the resulting solution with cyclohexylamine.

2. The process of separating the resin acids from tall oil which comprises selectively esterifying tall oil to form a mixture comprising fatty acid esters and resin acids, dissolving said mixture in a liquid petroleum hydrocarbon solvent, precipitating the resin acids from the resulting solution with cyclohexylamine, separating the resin acid cyclohexylamine salts so formed from said solution, and decomposing said salts to liberate the free resin acids.

3. The process of separating the resin acids from tall oil which comprises selectively esterifying tall oil to form a mixture comprising fatty acid esters and resin acids, dissolving said mixture in a liquid petroleum hydrocarbon solvent, and precipitating the resin acids from the resulting solution at a temperature between about $-10°$ C. and just below the boiling point of the solvent with cyclohexylamine.

4. The process of separating the resin acids from tall oil which comprises selectively esterifying tall oil to form a mixture comprising fatty acid esters and resin acids, dissolving said mixture in a liquid petroleum hydrocarbon solvent, and precipitating the resin acids from the resulting solution at a temperature between about $-10°$ and about $50°$ C. with cyclohexylamine.

5. The process of separating the resin acids from tall oil which comprises selectively esterifying tall oil to form a mixture comprising fatty acid esters and resin acids, dissolving said mixture in a liquid petroleum hydrocarbon solvent, and precipitating the resin acids from the resulting solution at a temperature between about $10°$ and about $30°$ C. with cyclohexylamine.

6. The process of separating the resin acids from tall oil which comprises selectively esterifying tall oil to form a mixture comprising fatty acid esters and resin acids, dissolving said mixture in a liquid petroleum hydrocarbon solvent, and precipitating the resin acids from the resulting solution at a temperature of $25°$ C. with cyclohexylamine.

7. The process of separating the resin acids from tall oil which comprises selectively esterifying tall oil to form a mixture comprising fatty acid esters and resin acids, dissolving said mixture in gasoline, and precipitating the resin acids from the gasoline solution with cyclohexylamine.

8. The process of separating the resin acids from tall oil which comprises selectively esterifying tall oil with methyl alcohol to form a mixture comprising fatty acid methyl esters and resin acids, dissolving said mixture in gasoline, and precipitating the resin acids from the gasoline solution with cyclohexylamine.

9. The process of separating the resin acids from tall oil which comprises selectively esterifying tall oil with ethyl alcohol to form a mixture comprising fatty acid ethyl esters and resin acids, dissolving said mixture in gasoline, and precipitating the resin acids from the gasoline solution with cyclohexylamine.

RONALD ROSHER.

REFERENCES CITED

The following references are of record in the file of this patent:

UNITED STATES PATENTS

| Number | Name | Date |
|---|---|---|
| 2,166,812 | Gayer et al. | July 18, 1939 |
| 2,419,211 | Harris et al. | Apr. 22, 1947 |